July 4, 1950  J. W. KENNEDY  2,513,879
HYDRAULIC RESISTANCE BRAKE
Filed June 30, 1947  2 Sheets-Sheet 1

Inventor
Joseph W. Kennedy
By Clarence A. O'Brien
and Harvey B. Jacobson
Attorneys July 4, 1950 J. W. KENNEDY 2,513,879
HYDRAULIC RESISTANCE BRAKE
Filed June 30, 1947 2 Sheets-Sheet 2
Fig. 4.
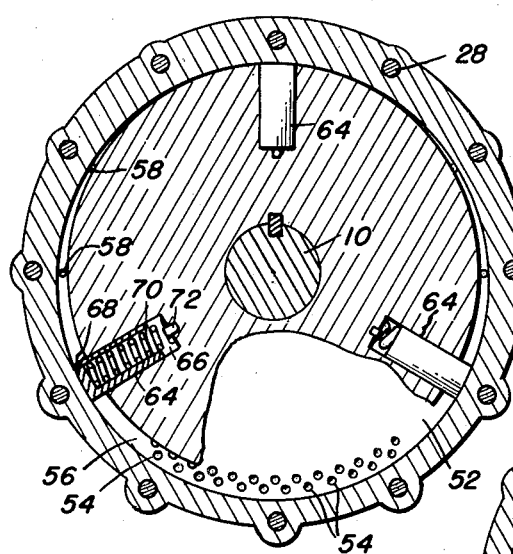
Fig. 7.
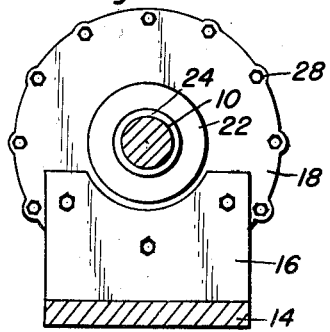
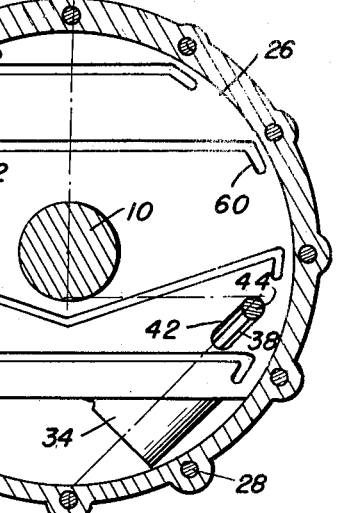
Fig. 6.
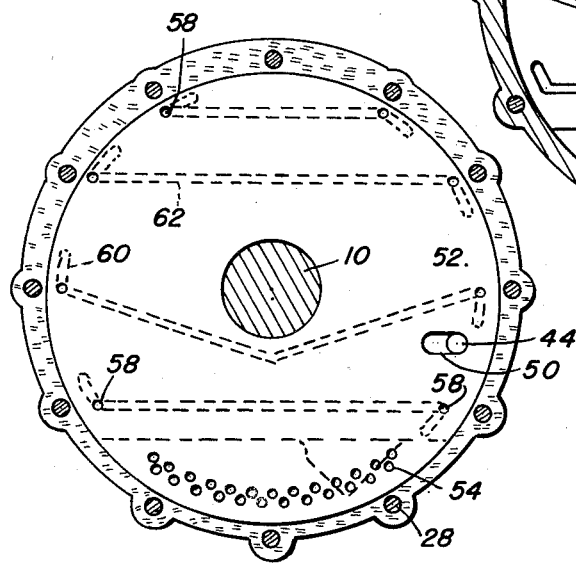
Fig. 5.
Inventor
Joseph W. Kennedy
By Clarence A. O'Brien
and Harvey B. Jacobson
Attorneys Patented July 4, 1950

2,513,879

UNITED STATES PATENT OFFICE 2,513,879

HYDRAULIC RESISTANCE BRAKE

Joseph W. Kennedy, Homestead, Pa.

Application June 30, 1947, Serial No. 758,138

6 Claims. (Cl. 188—90)

This invention relates generally to brakes, and more particularly to a brake mechanism comprising a fixed casing, a rotor eccentrically mounted within said casing and rigidly secured to a shaft to be braked, the rotor having a plurality of vanes which are successively brought into contact with oil in the crescent-shaped oil chamber defined by and between the rotor and casing, together with novel means for carying the volume of the oil in this chamber and other means for varying the degree of opening of ports leading to channels which connect the opposite sides of said chamber, the braking action resulting from the friction of the fluid forced through the said channels by the action of the vanes.

A primary object of this invention is to provide a brake which may be applied to any rotating shaft, more particularly shafts such as those found in overhead cranes, truck trailers, and similar applications, the braking action being absolutely positive and dependable, and capable of substantially locking the shaft against rotation.

Another salient object of this invention is to provide a braking mechanism in which no brake shoes are required, the wearing parts being normally of metal construction, thus providing for decreased maintenance and repair costs.

Another object of this invention is to provide a novel disk multiple valve structure which is used to fractionally close the ports of channels connecting the opposite sides of the crescent-shaped chamber between the rotor and the casing, which chamber results from the eccentric mounting of the rotor within said casing.

Still another object of this invention is to combine with a braking mechanism of this character a piston and cylinder in communication with the said chamber, the piston being mechanically connected to the disk mentioned above, so that the said ports are fractionally closed simultaneously with an increase in the quantity of oil contained in the said chamber, thus insuring absolutely positive action of the brake.

And a last object to be specifically mentioned is to provide a device of this character which is relatively inexpensive and practicable to manufacture, extremely simple and convenient to use, and which is sufficiently sturdy to provide for generally efficient and durable service.

With these objects definitely in view, this invention resides in certain novel features of construction, combination and arrangement of parts and portions as will be hereinafter described in detail in the specification, particularly pointed out in the appended claims, and illustrated in the accompanying drawings which form a material part of this application, and in which:

Figure 4 is a similar view taken on the line 4—4 in Figure 1, and in the direction of the arrows;

Figure 5 is a vertical transverse sectional view taken on the line 5—5 in Figure 1 and showing what is hereinafter referred to as the disk with the apertures indicated therein, and also indicating the slot in the disk which receives one end of a transversely disposed pin member connected with the piston which is best shown in Figures 1 and 3, together with contiguous structure;

Figure 1:
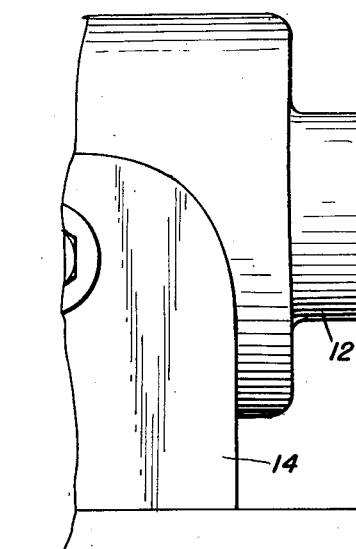
Figure 1 is a side elevational view of a bearing and a shaft with a braking mechanism constructed according to this invention operatively mounted thereon, the major portions of the braking mechanism being shown in vertical section, as taken substantially on the line 1—1 in Figure 6.
Figure 1:
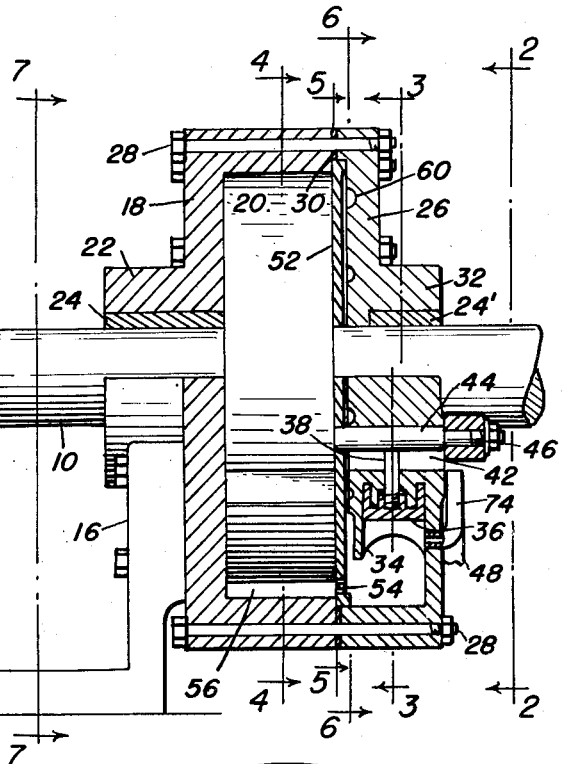
Figure 2:
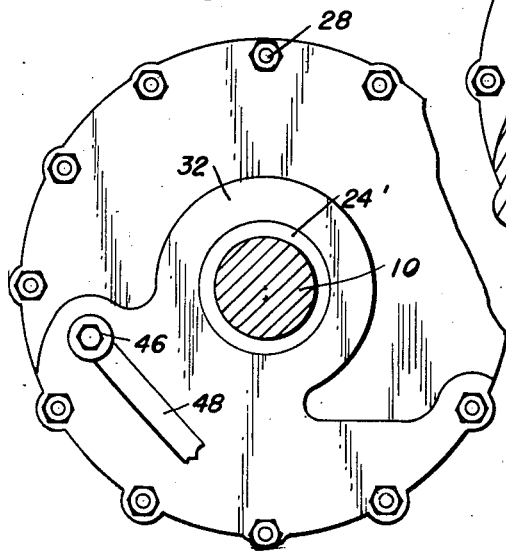
Figure 2 is an end elevational view of the structure shown in Figure 1, the view being taken on the line 2—2 in Figure 1 and in the direction of the arrows.
Figure 3:
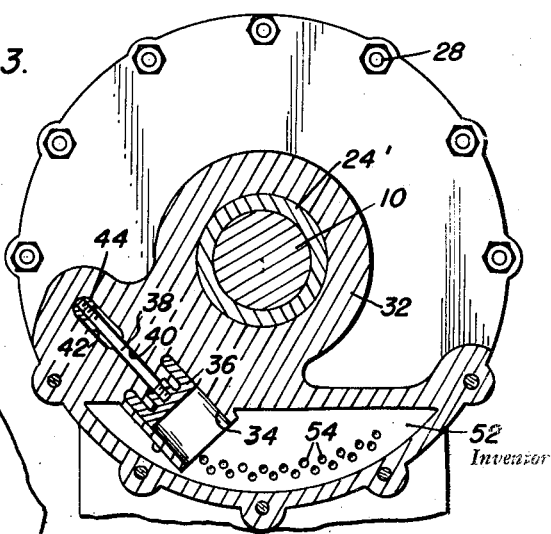
Figure 3 is a vertical transverse sectional view, taken on the line 3—3 in Figure 1.

Figure 6 is a vertical transverse sectional view of the brake, taken on the line 6—6 in Figure 1, and showing the channels formed in the housing and extending from side to side to connect the opposite sides of the crescent-shaped chamber between the rotor and the casing, it being noted that another slot is formed in the casing to receive and guide the transversely disposed pin referred to above, this figure also indicating a portion of the cylinder and the piston rod; and Figure 7 is a vertical transverse sectional view taken on the line 7—7 and showing a part of the bearings for the shaft and the supporting means for the housing, the view being on a slightly reduced scale.

Similar characters of reference designate similar or identical parts and portions throughout the specification and throughout the several views of the drawings.

Referring to these drawings in detail, the shaft 10 to be braked is illustrated as supported in a bearing 12 on a base or frame 14 which has an extending portion 16 providing support for the housing 18 of the brake mechanism. The members 10, 12, 14 and 16 are included in the drawing to indicate the environment wherewith this invention is adapted to be used and the structure of these elements will, of course, vary in accordance with the nature of the installation concerned.

The housing 18 may be made in two main portions, the numeral 18 indicating the larger portion thereof which is formed with a cylindrical recess to receive the rotor 20. The portion 18 of the housing is provided with a bearing portion 22 which will ordinarily be fitted with a sleeve bearing 24 which must be carefully fitted to provide an oil-tight seal between the shaft 10 and the bearing portion 22 of the housing. The other portion 26 of the housing is bolted to the portion 18 by transversely disposed bolts 28 peripherally disposed on the housing. A sealing ring 30 will ordinarily be required between the portions 18 and 26 of the housing to provide for an oil-tight seal between these parts. The portion 26 of the housing has integrally secured thereto an irregularly shaped extending portion 32 which carries a sleeve bearing 24' adapted to provide an oil-tight seal between the portion 32 of the housing and the contiguous portion of the shaft 10, and this portion 32 of the housing has a cylinder 34 formed therein to receive a piston 36. This piston 36 is actuated by a piston rod 38 which reciprocates within a bore 40 aligned with the cylinder 34, and the bore 40 communicates with an enlarged slot portion 42 which allows the movement of the transversely disposed pin 44 which is threadedly or otherwise secured to the end of the piston rod 38. The outer end of this transverse pin 44 is pivotally secured, as at 46, to an actuating control rod 48, while the inner end of this transverse pin 44 is inserted in the slot 50 in the apertured disk 52, as best illustrated in Figures 1 and 5.

The disk 52 is rotatably mounted between the main portion 18 of the housing and the portion 26 thereof, and bears against the rotor 20 on one side. A plurality of apertures 54 are formed in the disk 52 to provide communication between the lower end of the cylinder 34, when the device is disposed as illustrated in the drawings, and the crescent-shaped chamber 56 defined by and between the rotor 20 and the housing 18. It will be noted that the lower end of the cylinder 34 will substantially register with the portion of the chamber 56 which is greatest in cross sectional area. A plurality of spaced apertures 58 are provided in the disk 52 and these apertures are so spaced and positioned as to allow the disk 52 to function as a multiple valve to close and open elongated ports 60 which are formed at the ends of a plurality of transversely disposed channels 62 formed on the interior face of the housing portion 26. The exact form of these channels 62 is immaterial in this application, the essential feature thereof being that these channels communicate the opposite sides of the crescent-shaped chamber 56. A preferred form and distribution of these channels 62 is indicated in Figure 6, where four of these channels are shown connecting the opposite sides of the chamber 56. The elongated ports 60 allow movement of the piston 36 through a considerable distance in order to considerably increase the amount of oil contained in the chamber 56 before the channels 62 are closed by the action of the disk 52. This action will be clearly understood if reference be had to the drawings wherein it is shown how the transverse pin 44 can move through the slot 42 in the housing and the slot 50 in the disk while forcing the disk to rotate toward the position closing the elongated ports 60.

A plurality of vanes 64 are radially slidably mounted in slots 66 regularly spaced peripherally of the rotor 20. These vanes 64 are of a width equal to the width of the rotor and the outer end 68 of each vane is properly arcuately formed and otherwise adapted to provide for close fitting frictional engagement of the vane against the housing 18. The vanes are, of course, spring-biased radially outwardly by some structure analogous to the coiled spring 70 which is compressed between the inner end of the slot 66 and the end 68 of the vane, the spring being guided and held in position by a short pin 72 inserted axially in the end of the slot 66.

The operation of this invention will be clearly understood from the foregoing description of the mechanical details thereof, taken in connection with the above recitation of the objects sought to be achieved by this invention, but in recapitulation, it may be noted that the braking action is progressively applied by movement of the control rod 48 which causes the pin 44 to force the piston 36 in a direction causing more of the oil entrapped in the system to be forced into the chamber 56. The increase in the amount of oil in the chamber 56 will, of course, result in an increase in the braking action of the device and such braking action will be proportional to the amount of oil in this chamber. In the final or fully braked position, the pin 44 will have moved the disk 52 into a position closing the elongated ports 60. The oil will now no longer be bypassed from the opposite sides of the chamber 56 and what is essentially a fluid lock will be imposed between the rotor 20 and the housing 18. The perfection of this fluid lock will be dependent upon the degree of close fitting and fine machining of the parts concerned. An important feature of this invention is the inclusion of the combined breather tube and expansion chamber 74, illustrated in Figure 1. This combined tube and chamber is in communication with the upper portion of the cylinder 34 and allows excess oil to be isolated from the system temporarily when said oil expands as a result of a temperature rise. It has been found in practice, however, that this brake will not readily heat in use.

Though there has been shown a particular embodiment of this invention, this application is not limited to this particular embodiment, but it is desired to include in the scope of this invention the construction, combination and arrangement of parts and portions substantially as set forth in the appended claims.

Having described the invention, what is claimed as new is:

1. A brake mechanism comprising a fixed casing, a rotor eccentrically mounted within said casing and rigidly secured to a shaft to be braked, said rotor and casing defining between them a crescent-shaped oil chamber, a vane radially slidably mounted on said rotor to frictionally bear against said casing, by-pass channels in said casing directly connecting opposite sides of said chamber, and means to vary the volume of oil in said chamber.

2. A brake mechanism comprising a fixed casing, a rotor eccentrically mounted within said casing and rigidly secured to a shaft to be braked, said rotor and casing defining between them a crescent-shaped oil chamber, a vane radially slidably mounted on said rotor to frictionally bear against said casing, by-pass channels in said casing directly connecting opposite sides of said chamber, and means to vary the volume of oil in said chamber comprising a cylinder and piston, said cylinder being in communication with said chamber.

3. A brake mechanism comprising a fixed casing, a rotor eccentrically mounted within said casing and rigidly secured to a shaft to be braked, said rotor and casing defining between them a crescent-shaped oil chamber, a vane radially slidably mounted on said rotor to frictionally bear against said casing, a plurality of spaced by-pass channels in said casing directly connecting opposite sides of said chamber, and means to vary the volume of oil in said chamber, said channels having elongated ports.

4. A brake mechanism comprising a fixed casing, a rotor eccentrically mounted within said casing and rigidly secured to a shaft to be braked, said rotor and casing defining between them a crescent-shaped oil chamber, a vane radially slidably mounted on said rotor to frictionally bear against said casing, by-pass channels in said casing directly connecting opposite sides of said chamber, means to vary the volume of oil in said chamber, said channels having elongated ports, and means to fractionally close said ports in relation to the adjustment of said means to vary the volume of oil.

5. A brake mechanism comprising a fixed casing, a rotor eccentrically mounted within said casing and rigidly secured to a shaft to be braked, said rotor and casing defining between them a crescent-shaped oil chamber, a vane radially slidably mounted on said rotor to frictionally bear against said casing, a plurality of spaced by-pass channels in said casing directly connecting opposite sides of said chamber, means to vary the volume of oil in said chamber, said channels having elongated ports and to fractionally close said ports in relation to the adjustment of said means to vary the volume of oil, said means including an apertured disk rotatably mounted between one side of said rotor and said casing, said disk being connected to said piston to move therewith and functioning as multiple valve means with relation to said ports.

6. A brake mechanism comprising a fixed casing, a rotor eccentrically mounted within said casing and rigidly secured to a shaft to be braked, said rotor and casing defining between them a crescent-shaped oil chamber, a vane radially slidably mounted on said rotor to frictionally bear against said casing, by-pass channels extending transversely of said casing directly connecting opposite sides of said chamber, means to vary the volume of oil in said chamber, said channels having elongated ports and to fractionally close said ports in relation to the variable position of said means, said means including an apertured disk rotatably mounted between one side of said rotor and said casing, said disk being connected to said piston to move therewith and functioning as multiple valve means with relation to said ports, said ports and the apertures in said plate being positioned so that all said ports are opened and closed simultaneously, thus adapting the mechanism for braking the shaft against rotation in both directions.

JOSEPH W. KENNEDY.

REFERENCES CITED

The following references are of record in the file of this patent:

UNITED STATES PATENTS

| Number | Name | Date |
|---|---|---|
| 1,449,562 | Thompson | Mar. 27, 1923 |
| 1,501,444 | English et al. | July 15, 1924 |
| 1,653,360 | Howard | Dec. 20, 1927 |